US008738692B2

(12) United States Patent
Canning et al.

(10) Patent No.: US 8,738,692 B2
(45) Date of Patent: *May 27, 2014

(54) SELECTIVELY PROCESSING COOKIES IN A PROXY

(71) Applicant: International Business Machines Corporation, Armonk, NY (US)

(72) Inventors: Simon Gilbert Canning, Upper Coomera (AU); Scott Anthony Exton, Ormeau Hills (AU); Neil Ian Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,806

(22) Filed: Feb. 28, 2013

(65) Prior Publication Data

US 2013/0173815 A1 Jul. 4, 2013

Related U.S. Application Data

(63) Continuation of application No. 12/903,537, filed on Oct. 13, 2010.

(51) Int. Cl.
G06F 15/16 (2006.01)

(52) U.S. Cl.
USPC .............. 709/203; 228/227; 228/224; 726/12

(58) Field of Classification Search
USPC .............. 709/203, 227–228, 224, 225; 726/12
See application file for complete search history.

(56) References Cited

U.S. PATENT DOCUMENTS

| 7,209,969 | B2 | 4/2007 | Lahti et al. | |
|---|---|---|---|---|
| 2005/0015429 | A1* | 1/2005 | Ashley et al. | 709/200 |
| 2007/0157304 | A1 | 7/2007 | Logan et al. | |
| 2008/0034413 | A1 | 2/2008 | He et al. | |
| 2008/0222270 | A1* | 9/2008 | Gilbert | 709/217 |
| 2008/0294781 | A1 | 11/2008 | Hinton et al. | |
| 2009/0199285 | A1 | 8/2009 | Agarwal et al. | |
| 2011/0161709 | A1* | 6/2011 | Chen | 713/323 |
| 2011/0214163 | A1* | 9/2011 | Smith et al. | 726/4 |

OTHER PUBLICATIONS

CAMS Technical Paper, Cafesoft Technical Papers, Cafesoft, available on-line, at http://www.cafesoft.com/products/cams/camsTechnicalPaper.html, as of May, 2010.
Sommerlad, "Reverse Proxy Patterns," EuroPLoP, '2003.
Frahim et al, "SSL VPN Design Considerations," Cisco Press, Jun. 10, 2008.

* cited by examiner

*Primary Examiner* — Abdullahi Salad
(74) *Attorney, Agent, or Firm* — Jeffrey S. LaBaw; David H. Judson

(57) ABSTRACT

An intermediary (such as a web reverse proxy), which is located between a web browser and one or more backend applications, manages cookies that are provided by the backend applications and returned to the web browser during a user session. The intermediary decides which cookies should be sent to the browser and which cookies should be stored therein. Preferably, this determination is made in an automated manner by examining the response for any cookie-dependent code (e.g., scripting) included in the response.

7 Claims, 5 Drawing Sheets

US 8,738,692 B2

SELECTIVELY PROCESSING COOKIES IN A PROXY

CROSS-REFERENCE TO RELATED APPLICATION

This application is related to U.S. Ser. No. 12/786,616, filed May 25, 2010, titled "Method and apparatus for single sign-off using cookie tracking in a proxy."

BACKGROUND OF THE INVENTION

1. Technical Field

This disclosure relates generally to web application security and in particular to a method and system for single sign-off using cookie tracking in a proxy server.

2. Background of the Related Art

Web portals centralize access to information, applications, and services for employees, customers, or partners. They deliver a consolidated view that lets users access the most important electronic resources of the organization using a standard technology (a web browser), simply and efficiently. Within a Web portal or like environment, typically a proxy or web server acts as a front-end "point of contact" to a set of back-end applications or application components. In this type of environment, it is desirable that the mechanism used to provide authentication and session management at the web portal layer should also provide these functions for any back-end applications that are included in a consolidated view.

In this type of environment, approaches to session management typically have each back end application or application component requiring its own session state management, and each such application or component may implement its own session management technique. Where an end user is accessing multiple applications within a single enterprise, his or her browser ends up managing independent session management items (often as many as a different item per application). Typically, in this environment, these items are HTTP cookies, as the behavior of such cookies (although not intended for session management) provides reasonable session management.

In particular, HTTP cookies (see IETF RFC 2109) provide a way of managing sessions and state between web browsers and web servers using the HTTP protocol. When an authenticating reverse proxy is used to enable single sign-on (SSO) to multiple backend applications running, for example, on a web server, cookies from the backend applications are typically permitted to flow back to the web browser. When a user logs out of the reverse proxy, however, his or her existing session with the backend server can remain in the web browser's session cache, sometimes called a cookie jar. If a different user then authenticates to the reverse proxy using the same web browser, it is possible that the previous user's sessions in the backend proxied application could be used as opposed to a new session for the new user.

One solution to this problem is to embed script(s) within the logoff page of the reverse proxy to clear any cookies for the proxied applications. One of the drawbacks of this approach is that new scripts have to be added for each proxied application matching all of the cookies for this particular proxied web server. This becomes a manual process for a system administrator. Moreover, depending on the type of proxying method used and how the cookie is stored in the web browser's cookie jar, these cookies may not be able to be deleted easily. This approach can also require modifications to the proxied server's log off page, which can be quite intrusive.

Other existing solutions to this problem include storing cookies within the cookie jar in the proxy but never sending them to the client browser. The cookies are then expired within the cookie jar on logout to provide single sign-off from backend servers. A limitation of this approach, however, is that at times cookies are required in the browser for the web application to operate correctly. This approach is undesirable in that it does not allow cookies to flow back to the web browser during the user session.

It is desired to provide enhanced techniques for HTTP cookie management that addresses the above-described deficiencies.

BRIEF SUMMARY OF THE INVENTION

According to this disclosure, an intermediary (such as a web reverse proxy), which is located between a web browser and one or more backend applications, manages cookies that are provided by the backend applications and returned to the web browser during a user session. The intermediary decides which cookies should be sent to the browser and which cookies should be stored therein. Preferably, this determination is made in an automated manner by examining the response for any cookie-dependent code (e.g., scripting) included in the response.

According to an embodiment, a method is operative at an intermediary between a client browser and one or more backend applications during an existing authenticated session with a user operating the client browser. The intermediary may be a reverse proxy. The method is initiated during a request-response interaction between the browser and a backend application that traverses the proxy. In particular, and responsive to the proxy forwarding a request to a backend application, a response is received at the proxy. The proxy makes a determination whether the response is associated with a cookie that should be returned to the client browser; if so, the proxy tracks the cookie by storing information about the cookie (e.g., name, and optionally the cookie value) in a per-user session cache object associated with the session, and it then forwards the response, including the cookie, to the client browser. If the proxy determines that the response is not associated with a cookie that should be returned, tracks the cookie and, as necessary, caches it locally (for re-use). In a representative embodiment, the determination of whether the response is associated with a cookie that should be returned to the client browser is made by examining the response for the presence of cookie-dependent code, such as client-side scripting.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
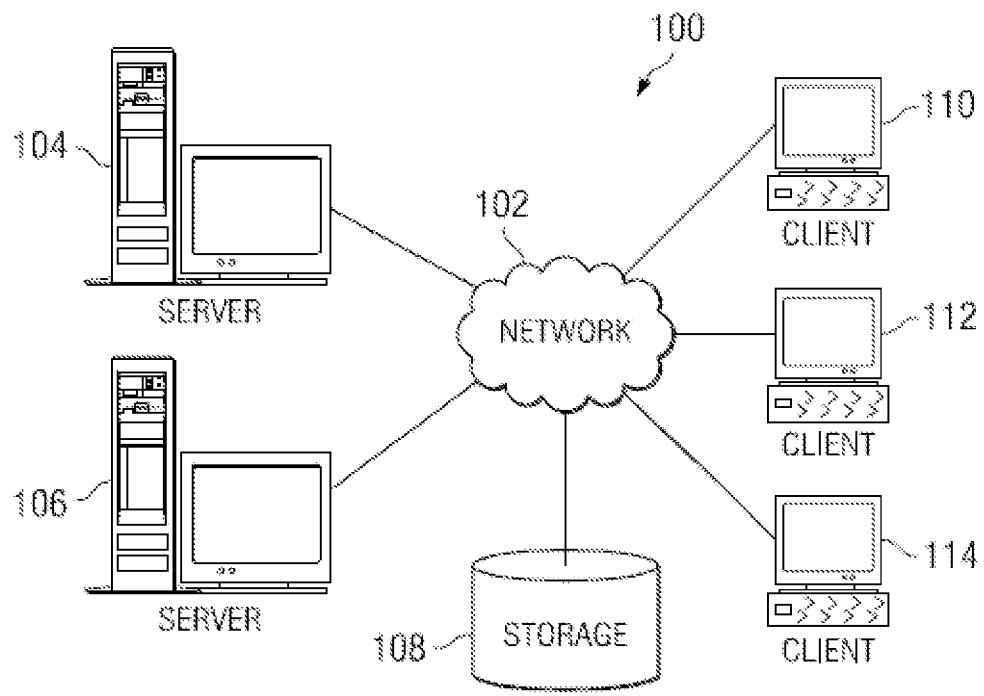
FIG. 1 depicts an exemplary block diagram of a distributed data processing environment in which exemplary aspects of the illustrative embodiments may be implemented.
Figure 2:
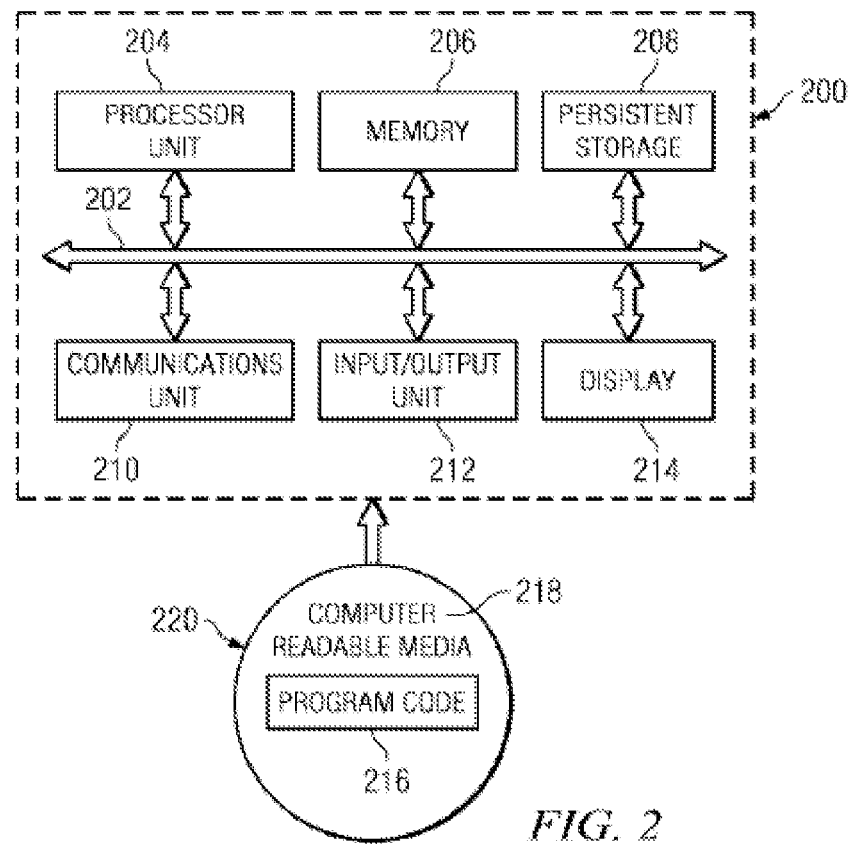
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
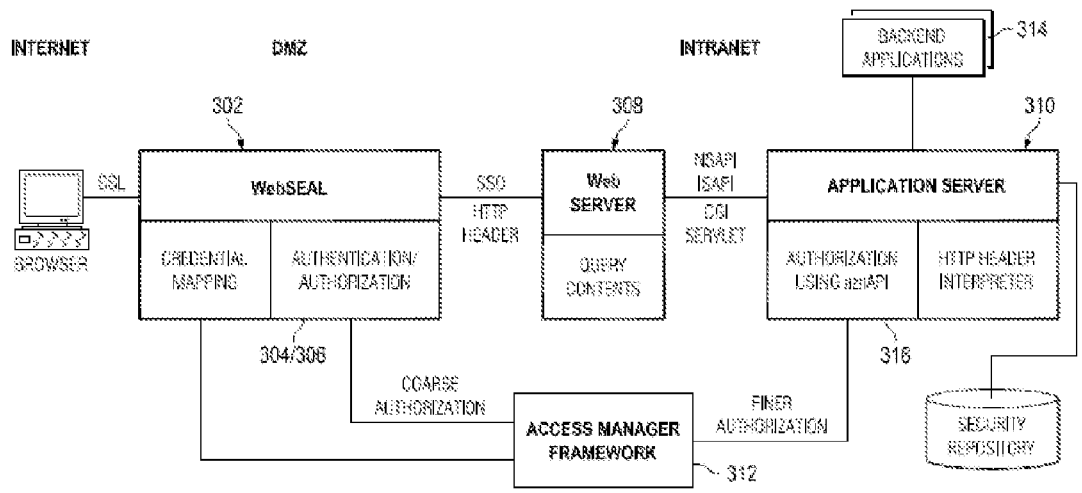
FIG. 3 illustrates a Web portal having an access management framework in which the subject disclosure may be implemented.

As will now be described, the technique that is the subject of this disclosure typically is implemented in a system that includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

Figure 4:
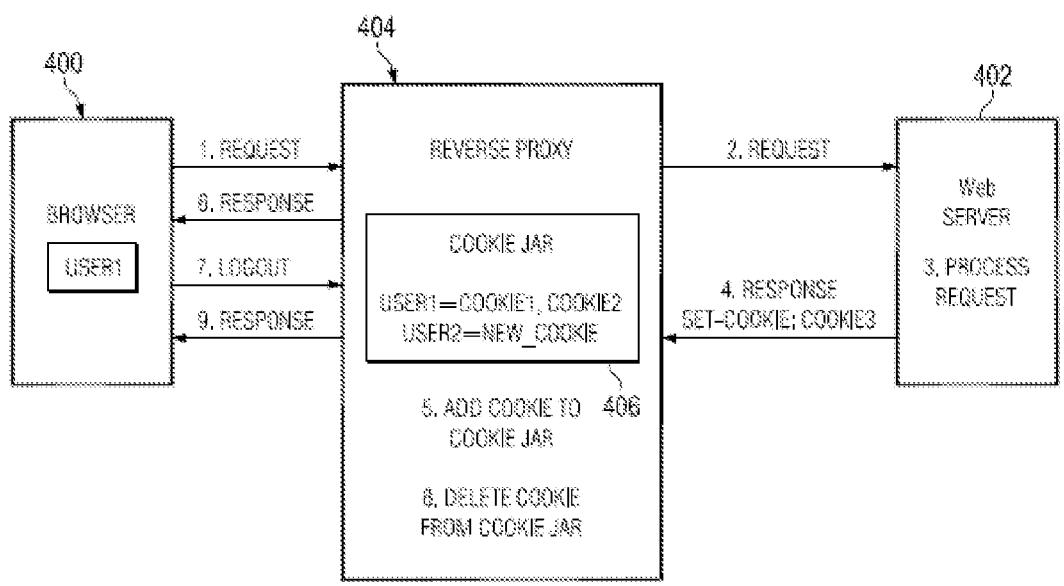
FIG. 4 is a simplified block diagram of a web browser interacting with a backend application through a reverse proxy that stores cookies in a session cache or "cookie jar" without returning those cookies to the browser.

FIG. 4 is a simplified block diagram showing an example information flow without cookie management as described below. In this example, a first user (User1) of web browser 400 has established an existing authentication session with backend web server 402 using the reverse proxy 404, such as TAM. The proxy includes a session cache 406 (or "cookie jar") that is instantiated on a per-user session basis. In step (1), the first user uses the web browser 400 to make an HTTP request to the web server 402 via the reverse proxy 404. The reverse proxy 404 receives the request and, at step (2), passes it to the web server 402. The web server 402 process the request at step (3). At step (4), the web server 402 returns a response to the reverse proxy 404 containing a Set-Cookie HTTP header. At step (5), the reverse proxy 404 detects the Set-Cookie header and adds the cookie to its cookie jar 406 for the authenticated user (in this case, user1). At step (6), the reverse proxy sends the response back to the web browser 400 but removes the 'Set-Cookie' header. Thus, in this prior art approach, the cookie is not returned to the web browser. Thereafter, assume that the first user then uses the browser to log out of the session it has with the reverse proxy 404. This is step (7). At step (8), the reverse proxy 404 accesses the cookie jar to determine whether to delete any cookies. At step (9), the reverse proxy 404 returns a logout response to the browser. The reverse proxy then completes other session cleanup activities.

FIG. 4 is one possible baseline approach that is addressed by the cookie management techniques disclosed herein, but it is not limiting, as the disclosed subject matter may also be applied to enhance prior techniques where there is no cookie jar in the proxy.

As described in the disclosure of commonly-owned, pending application Ser. No. 12/786,616, the baseline approach shown in FIG. 4 can be extended via a cookie jar functionality that provides for a "managed" cookie (versus merely a "stored" cookie or no cookie jar at all). A stored cookie, as its name implies, is a cookie that is stored within the cookie jar in the proxy. A "managed" cookie, in contrast, is a cookie that also resides at the client browser (e.g., in a browser cache) but that is reset when the user log's out of the WebSEAL (or its equivalent) process. According to this disclosure, preferably all cookies pass through the cookie jar. Cookies that are intended to be "stored" are removed from the HTTP response stream (back to the client). All other cookies which are set in the response are "noted." When a user's session is terminated (i.e., when the proxy receives a logoff or other session termination), a reset for each "noted" cookie is then sent back to the client in a response. Preferably, the reset involves setting an empty cookie with a past expiry date. An alternative is to provide a specialized HTTP "reset" header (although the formal HTTP protocol specification does not currently include one). In this manner, the proxy provides a basic logout function for junctioned applications (i.e. those backend applications to which the user has been in communication via the proxy). As described in Ser. No. 12/786,616, managed cookies are enabled or disabled via a configuration file (or item) that includes pattern-matched names of cookies that are to be managed.

Figure 5:
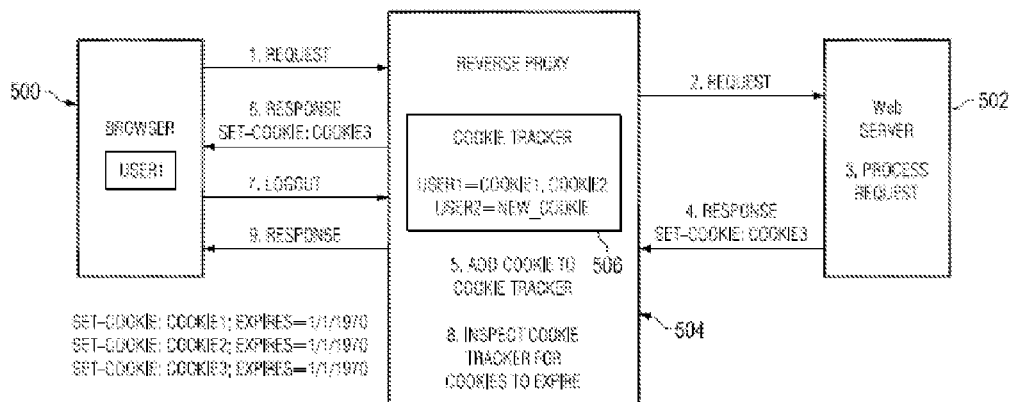
FIG. 5 illustrates a block diagram of a web browser interacting with a backend application through an enhanced reverse proxy according to the techniques described herein.

FIG. 5 illustrates a simplified block diagram of the managed cookie functionality described in Ser. No. 12/786,616. In this embodiment, once again a first user (User1) of web browser 500 has established an existing authentication session with backend web server 502 using the reverse proxy 504, such as TAM, which includes a "cookie tracker" 506. The cookie tracker 506 includes a per-user session-based cookie jar for the user's cookies, as has been described, as well as additional functionality that implements a cookie reset function. In this embodiment, preferably all cookies that pass through the reverse proxy 504 are "noted" by the cookie tracker component 506. Preferably, a cookie is "noted" by storing information about the cookie (e.g., the cookie name and optionally its value) in the cookie jar. When a user's session is terminated, a reset for each 'noted' cookie is sent in an HTTP response to the web browser. As described above, in one embodiment, the reset essentially involves setting the cookie with an empty value and with a expiry date that has past.

The detailed operating flow is as follows. At step (1), the first user uses the web browser 500 to make a HTTP request to the web server 502 via the reverse proxy 504 (with an existing authenticated session). At step (2), the reverse proxy 504 receives the request and passes it to the web server 502. At step (3), the web server 502 processes the request. At step (4), the web server 502 returns a response to the reverse proxy 504 containing a Set-Cookie HTTP header. At step (5), the reverse proxy detects the Set-Cookie header and adds information about the cookie to its cookie tracker 506 for the authenticated user 'user1'. At this point the cookie has been "noted" in the cookie jar. At step (6), the reverse proxy 504 sends an HTTP response back to the web browser 500, which response includes the Set-Cookie header for the cookie from the previous step. Thereafter, it is assumed that the first user uses the browser to log out of the session it has with the reverse proxy. A logout is then sent at step (7). At step (8), the reverse proxy 504 accesses the cookie tracker 506 to determine whether to expire any cookies. If there are any cookies listed in the cookie tracker 506 for this user session, a response is sent back to the browser containing Set-Cookie headers with valid dates set in the past. This operation is indicated at step (9), and it serves to destroy the existing cookies in the browser. In this manner, the reverse proxy removes the web browser's ability to maintain a session with the backend web server. The user's cookies within the cookie tracker 506 also are deleted. The reverse proxy then completes other session cleanup activities as required to complete the logoff.

Figure 6:
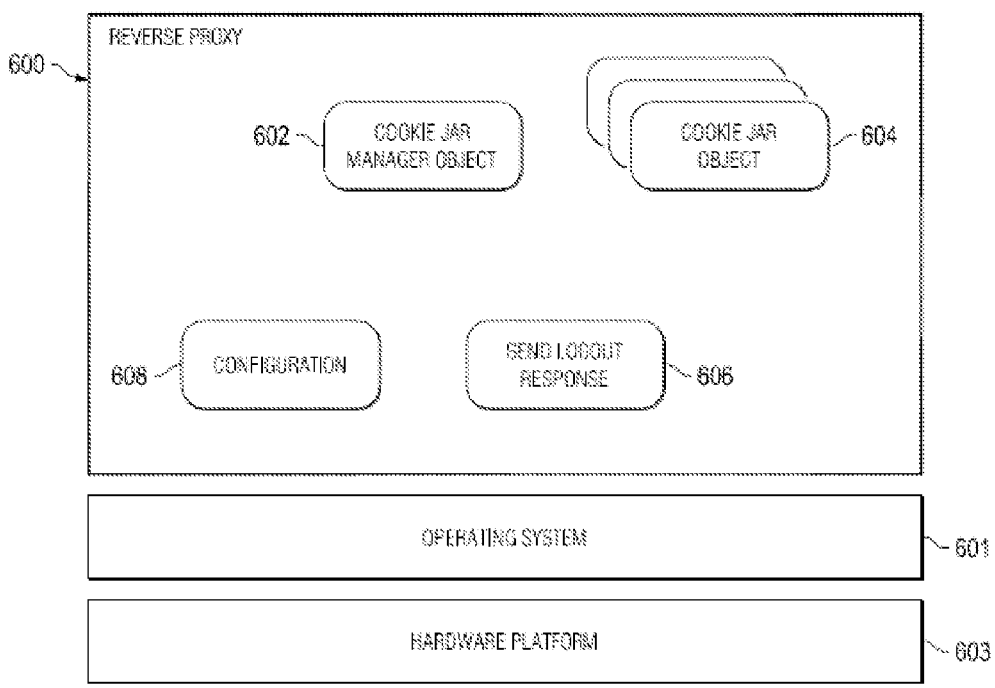
FIG. 6 is a block diagram of cookie tracker functionality in a proxy according to the teachings herein.

One of ordinary skill will appreciate that FIG. 6 describes a track and forward approach, whereas the known technique of FIG. 5 is a store and not forward approach.

FIG. 6 is a representative cookie tracker implemented in WebSEAL. In this illustrative example, which is also described in Ser. No. 12/786,616, the proxy 600 executes a cookie jar manager Java object 602 that is used to store configuration details for the cookie jar. This object includes a configuration item that controls whether a cookie reset occurs during a session log out. The proxy 600 also includes a cookie jar Java object 604 which, as the name suggests, manages the cookies jar for a particular user session. This object is extended by adding an attribute to the class that contains a list of cookies that are to be reset upon a session logout. The proxy 600 also includes a send logout response function 606 (referred to as send_logout_response ( ) that is responsible for constructing the response to the logout request (step (7) in FIG. 5). This function is extended to call a resetManaged-Cookie ( ) function in the cookie jar object in the event of a successful log out. The proxy also includes a configuration item 608 that is added to enable/disable the above-described functionality. In this embodiment, proxy 600 executes in association with an operating system 601 on hardware platform 603 to comprise a particular machine to carry out the managed cookie function described.

With the above components in FIG. 6 as background, the following describes a specific implementation of the cookie tracker for TAM. As noted above, using cookie jars Web-SEAL host cookies on behalf of browsers and provides them to backend applications in forwarded requests. As noted, a WebSEAL cookie jar is instantiated on a per-user session basis (which is shown by the multiple instances shown in FIG. 6). Cookies not stored in the cookie jar are passed back to the client browser for storage.

The cookie jar stores and handles cookies as defined by the following configuration entries in a [junction] configuration file 608 stanza:

managed-cookies-list

This list contains a comma-separated list of pattern matched cookie names. Cookies that match the patterns on this list are stored in the cookie jar. If this list is empty, the cookie jar is effectively disabled.

reset-cookies-list

This list determines which cookies will be reset when the user session is logged out. The request received from the client and the response sent back to the client are both examined for matching cookies.

share-cookies

This flag determines whether or not cookies stored in the cookie jar will be shared between different junctions.

validate-backend-domain-cookie

Domain checking on cookies is only performed if this entry is set to true.

allow-backend-domain-cookies

During domain validation, if this entry is set to false, the domain is removed from the cookie.

All of the above configuration items, with the exception of share-cookies, can be customized for a particular junction by adding an adjusted configuration item to a configuration file.

Preferably, as noted above all response cookies pass through the WebSEAL cookie jar. Cookies that match the patterns defined in managed-cookies-list are stored in the cookie jar and removed from the response stream to the browser. Those that are not stored in the cookie jar are passed back to the client.

When a request to a junctioned server is sent from the browser to WebSEAL, the cookie jar is checked to see if the request requires cookies to be sent to the junctioned server. If the request does require a cookie from the cookie jar, the cookie is added to the request. If the cookie has expired, the cookie is removed from the cookie jar and not sent. When a user performs a logout, a reset for selected cookies that are not stored in the cookie jar is sent back in the response. Web-SEAL resets any cookies with names that match the list of patterns in the reset-cookies-list stanza entry. As has been described, the reset implements a basic logout for junctioned applications.

As described above, the cookie jar manager object 602 is used to store the configuration details for the cookie jar. This object is extended to include a configuration item that controls whether a cookie reset occurs during a session log out.

As described above, the cookie jar object manages the cookie jar for a particular user session. This object is extended to describe the concept of a managed cookie, as distinct from a stored cookie. A private attribute is added to the class that contains the list of cookies that need to be reset upon a session logout.

As also described, the send logout response function is responsible for constructing the response to a logout request. This function is extended to call a resetManagedCookies( ) function (in object 604) in the event of a successful log out.

As described in Ser. No. 12/786,616, the configuration file may be of any convenient format. It is used to enable or disable the managed cookie functionality. As noted above, configuration in this manner allows for specifying cookies that should be tracked and deleted (if found) upon logout of the reverse proxy and cookies that should not be deleted. In the case where some cookies are tracked by the reverse proxy and sent to the browser while other cookies are stored in the reverse proxy, two lists of regular expressions could be used for each approach. In the event that a particular cookie matches both lists, a third configuration option may be used to decide which action should take precedence.

Automated Processing of HTTP Responses

While the above-described approach is advantageous, it requires the creation, management, maintenance and updating of configuration information (i.e., the configuration file referred to above as the managed-cookies-list). This requires a manual analysis of the HTTP traffic to determine how the values of the cookies (or domains) that should be included in the list. Such a manual process may be cumbersome and may be prone to errors, which can lead to unwanted cookies being sent to the browser if configured incorrectly. This, in turn, could lead to security vulnerabilities.

Thus, as an alternative embodiment, HTTP responses are selectively processed by the proxy to determine which cookies should be sent to the browser and which cookies should be stored therein. Preferably, and as will be seen, preferably this determination is made in an automated manner by examining a particular response as it passes through the proxy for any cookie-dependent code (e.g., scripting) included in the response. Thus, the evaluation is carried out during a request-response interaction between the browser and a backend application that traverses the proxy. In particular, and responsive to the proxy forwarding a request to a backend application, a response is received at the proxy. By examining the response for certain characteristics, (e.g., the existence of cookie-dependent code), the proxy makes a determination whether the response is associated with a cookie that should be returned to the client browser; if so, the proxy tracks the cookie by storing information about the cookie (e.g., name, and optionally the cookie value) in a per-user session cache object associated with the session, and it then forwards the response, including the cookie, to the client browser. (The cookie may be part of the response received from the backend application, or it may be obtained from the cookie jar in the proxy). If, however, the proxy determines that the response is not associated with a cookie that should be returned, the proxy still tracks the cookie and, as necessary, caches it locally (for re-use). In a representative embodiment, the determination of whether the response is associated with a cookie that should be returned to the client browser is made by examining the response for the presence of cookie-dependent code, such as client-side scripting.

Figure 7:
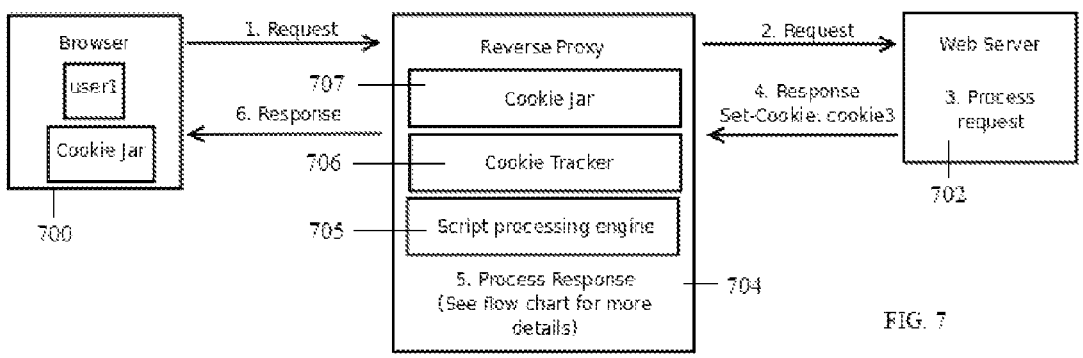
FIG. 7 is a block diagram of an alternative embodiment of the enhanced reverse proxy that includes a script processing engine to automate the process of determining whether particular cookies are forwarded to the web browser.

The detailed operating flow is shown in FIG. 7. At step (1), a user uses the web browser 700 to make a HTTP request to the web server 702 via the reverse proxy 704 (with an existing authenticated session). At step (2), the reverse proxy 704 receives the request and passes it to the web server 702. At step (3), the web server 702 processes the request. At step (4), the web server 702 returns a response to the reverse proxy 704 containing a Set-Cookie HTTP header. At step (5), the reverse proxy detects the Set-Cookie header and processes the response through a script processing engine 705 as will be described in more detail below with respect to FIG. 8. As described above, the proxy also adds information about the cookie to its cookie tracker 706 for the authenticated user 'user1'. At this point, and as described above with respect to the FIG. 6 embodiment, the cookie has been "noted" in the cookie jar 707. At step (6), the reverse proxy 704 sends an HTTP response back to the web browser 700, which response includes the Set-Cookie header for the cookie from the previous step. The response delivered in step (6) may or may not include the actual cookie, depending on the operation of the script processing engine 705, which is now described.

Figure 8:
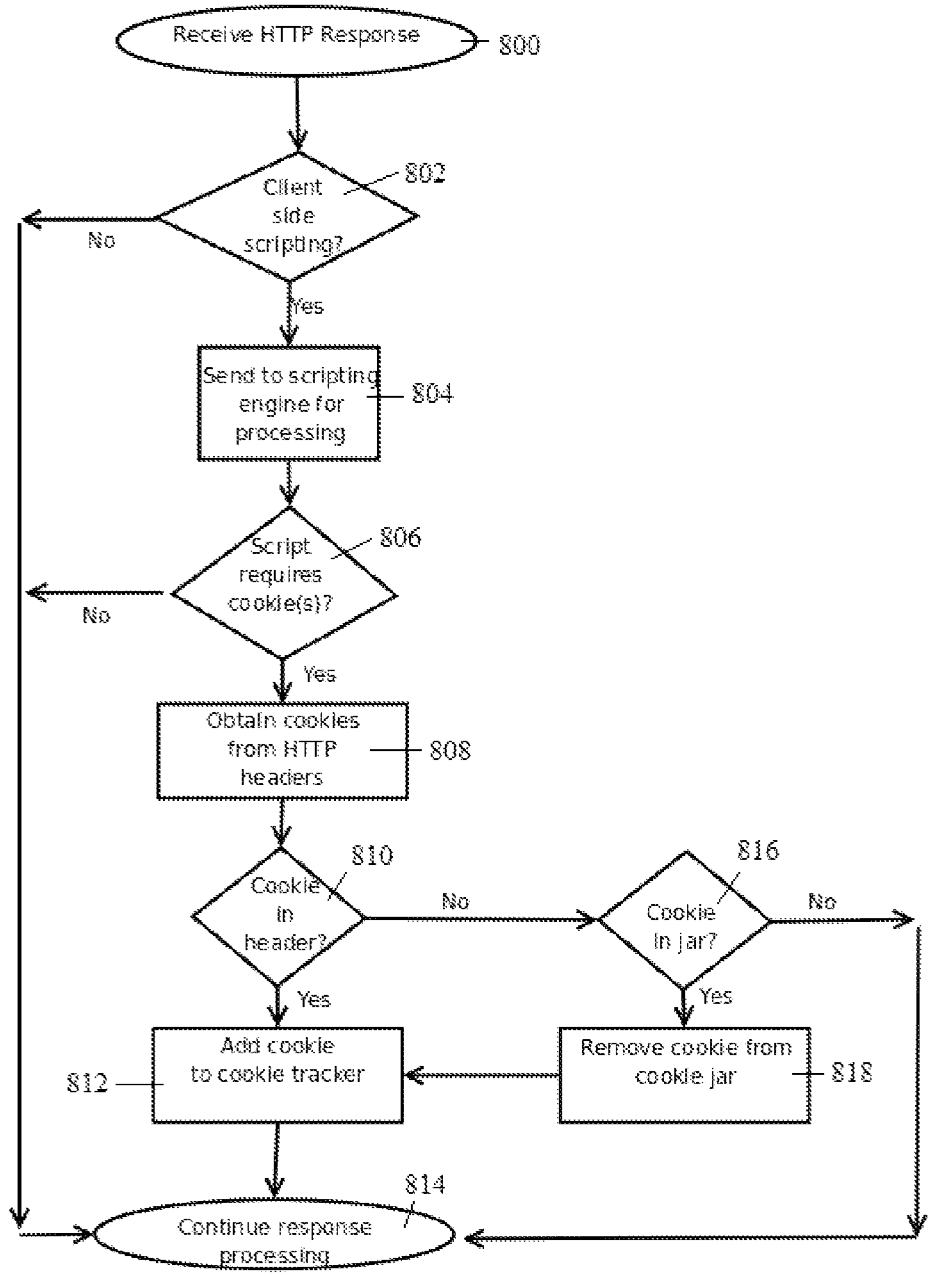
FIG. 8 is a process flow diagram illustrating the alternative embodiment wherein the script processing engine is used to determine whether a particular cookie should be returned to the requesting client web browser.

As seen in FIG. 8, the HTTP response is received at the proxy at step 800. At step 802, a test is performed at step 802 to determine whether the HTTP response received includes client-side scripting code. The absence of any such client-side scripting code indicates that the response (once received at and interpreted by the client browser) is not dependent on any cookie. If, however, the test at step 802 indicates that the HTTP response does include client-side scripting, the proxy forwards this client-side scripting to the script processing engine 705 (of FIG. 7) for further analysis. This is step 804. At step 806, the script processing engine performs an analysis to test whether a particular script is cookie-dependent, i.e., requires a cookie for completion. The test at step 806 is iterated (repeated) for each script that is forwarded to the script processing engine. If the outcome of the test at step 806 indicates that the script (although present) is not cookie-dependent, the routine branches as indicated. If, however, the outcome of the test at step 806 indicates that the particular script is cookie-dependent, then the proxy continues the processing at step 808. At this point, the proxy obtains one or more cookies from the HTTP headers of the response. A test is then performed at step 810 to determine whether the particular cookie being examined was obtained from an HTTP header in this particular response. This test is necessary because the proxy may have the cookie as a result of it being sent in a previous response. If the outcome of the test at step 810 is positive, the proxy continues at step 812 to add the cookie to the cookie tracker. This operation, as described above, serves to add the cookie to the per-user session object cache associated with the session. The routine then continues at step 814 to continue the response processing. Because the outcome of the individual tests at steps 802, 806 and 810 are positive, the response provided to the client browser by the proxy includes the cookie.

The continue response processing step 814 is also met when either the outcome of the step 802 or the step 806 is negative. In either event, the continue response processing step 814 tracks the cookie (as described above) and caches the cookie in the cookie jar (the per-user session object cache) for re-use. By caching the cookie, the cookie is linked to the user session associated with the per-user session object cache. The cached cookie is re-used by the proxy as needed when, on behalf of the client browser, the proxy makes a subsequent request to one of the backend applications.

Referring back to FIG. 8, in the event the outcome of the test at step 810 is negative, the proxy routine branches to step 816 to test whether the cookie in question is already present in the cookie jar (the per user-session object cache). If the outcome of the test at step 810 is negative, the routine branches back to the continue response processing step as previously described. If, however, the outcome of the test at step 816 is positive, the proxy removes the cookie from the cookie jar at step 818 and returns to step 812. This completes the processing.

Thus, according to the functionality described in FIG. 8, the content (e.g., client scripting code) returned by the back-end application is inspected via a processing engine in the proxy to determine whether cookies are required at the client. If the processing engine determines that a particular cookie should be sent back to the client browser, the proxy does so; in contrast, if the particular content in the response is not cookie-dependent, the proxy does not forward the cookie back to the client browser. In either case, however, the cookie is tracked at the proxy (in the per user-session cache object) to facilitate additional control over the session, such as single sign-off.

The script processing engine may be implemented in any convenient manner. One particular implementation is the Mozilla C implementation of JavaScript, also known as Spider Monkey. The script processing engine includes an HTML (or other markup language) parser, or the engine may use an existing HTML parser such as the one found in WebSEAL. These parsers identify client-side scripting that in turn must "read" the contents of a cookie so that the browser can render specific content (e.g., a username) on a page. A JavaScript "document.cookie" property would be evidence of this functionality. Thus, in a representative operation, the script processing engine parses the HTTP response from the backend application, identifies a JavaScript, parses that script for the document.cookie property (or other similar properties), and, if the property is present, flags the HTTP response as being associated with a cookie that should be returned to the client browser. If, on the other hand, the HTTP response does not include any such script, or if any such script (if present) does not include any such property, the proxy flags the HTTP response as being one that is not associated with a cookie that should be returned to the client browser.

The subject matter described herein has many advantages. The mechanism for determining if particular cookies should be sent to the browser is automated and based on an examination of the client's need for the cookie in the first instance. There is no requirement for any particular proxy configuration or user input, as the parsing function described above automatically determines the existence of any client-side cookie-dependent code in the HTTP response provided by the backend application. The proxy also tracks cookies issued by web servers and associates them with a user session. The proxy allows certain (but as noted above not all) cookies to flow back to the browser without being blocked at the proxy. The proxy may also provide the additional security of ensuring that cookies will be expired upon a logout operation. It also facilitates management of cookies for all different applications with different cookies.

The approach described herein requires no manual analysis of HTTP requests to determine cookie behavior, and no need to establish any configuration to enforce such behavior. The automated technique described herein reduces the security exposure of the proxy by ensuring that only cookies that are absolutely necessary to be sent back to the browser are, in fact, returned. If the proxy determines that the HTTP response has a cookie associated therewith that need not be returned, the cookie contents are still cached in the proxy (and remain linked to the user session).

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the managed cookie functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cookie tracker components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises managed cookie framework that provides single sign-off in a proxy.

The managed cookie function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "cookie" should be broadly construed to refer to an HTTP cookie (RFC 2109) or, more generally, any data structure that includes session-specific data associated with the server-side instance that returns that data structure.

Having described our invention, what we now claim is as follows.

The invention claimed is:

1. A method, operative at an intermediary between a client browser and one or more backend applications during an existing authenticated session with a user operating the client browser, the method comprising:
    responsive to forwarding a request to a backend application, receiving a response;
    making a determination whether the response is associated with a cookie that should be returned to the client browser by examining the response for presence of code whose execution in the client browser requires a cookie, wherein if the response includes code whose execution in the client browser requires a cookie, marking the response as associated with a cookie that should be returned to the client browser;
    if the response is associated with a cookie that should be returned to the client browser, tracking the cookie in a per-user session cache object associated with the session; and
    forwarding the response including the cookie to the client browser;
    wherein at least one of the receiving, making, tracking and forwarding steps is carried out in software executing in a hardware element.

2. The method as described in claim 1 wherein if the response is associated with a cookie that need not be returned to the client browser:
    tracking the cookie in the per-user session cache object associated with the session; and
    caching the cookie for re-use by the intermediary on a subsequent request to a backend application on behalf of the client browser.

3. The method as described in claim 1 wherein the code whose execution in the client browser requires a cookie is a script.

4. The method as described in claim 1 wherein the intermediary is a web reverse proxy and the response from the backend application is an HTTP response.

5. The method as described in claim 1 wherein tracking the cookie in the per-user session cache object stores a name of the cookie and its value.

6. The method as described in claim 1 wherein, if the response is associated with a cookie that should be returned to the client browser, the method further includes making a determination whether the response includes the cookie.

7. The method as described in claim 6 wherein, if the response does not include the cookie, making a determination whether the cookie is stored in the per-user session cache object.

* * * * *